United States Patent [19]

Webb

[11] Patent Number: 4,905,119

[45] Date of Patent: Feb. 27, 1990

[54] SOLID STATE OVERVOLTAGE PROTECTION CIRCUIT

[75] Inventor: Monty F. Webb, Richardson, Tex.

[73] Assignee: Teccor Electronics, Inc., Irving, Tex.

[21] Appl. No.: 212,195

[22] Filed: Jun. 27, 1988

[51] Int. Cl.⁴ .............................................. H02H 9/00
[52] U.S. Cl. ..................................... 361/119; 361/56; 361/111; 361/117; 379/331; 379/412
[58] Field of Search ...................... 361/56, 86, 91, 111, 361/117, 118, 119; 379/331, 412

[56] References Cited

U.S. PATENT DOCUMENTS

| | | | |
|---|---|---|---|
| 4,282,555 | 8/1981 | Suedberg | 361/119 |
| 4,408,248 | 10/1983 | Bulley et al. | 361/91 |
| 4,695,916 | 9/1987 | Saton et al. | 361/119 X |

*Primary Examiner*—Derek S. Jennings
*Attorney, Agent, or Firm*—Richards, Medlock & Andrews

[57] ABSTRACT

An overvoltage protection circuit for electronic equipment having tip and ring lines includes a first voltage sensitive switch having first and second teminals. The first terminal of the first switch is connected to the tip line. A second voltage sensitive switch includes first and second terminals. The first terminal of the second switch is connected to the second terminal of the first switch, and the second terminal thereof is connected to the ring line. A third voltage sensitive switch includes first and second terminals. The first terminal of the third switch is connected to the second terminal of the first switch and to the first terminal of the second switch. The second terminal of the third switch is connected to ground potential. The switches are conductive when a respective voltage threshold is exceeded.

13 Claims, 2 Drawing Sheets

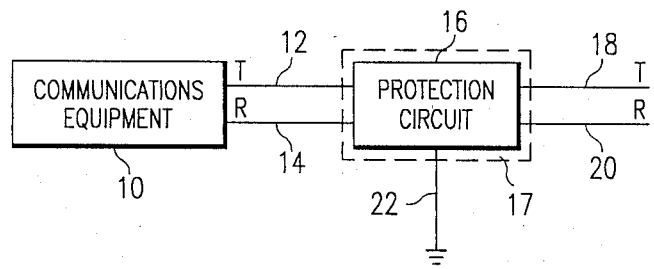
FIG. 1
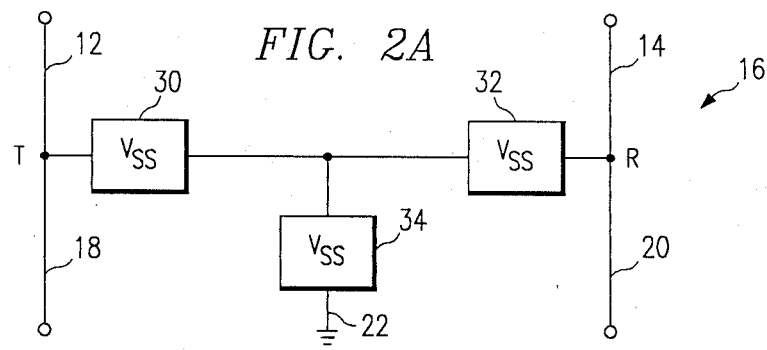
FIG. 2A
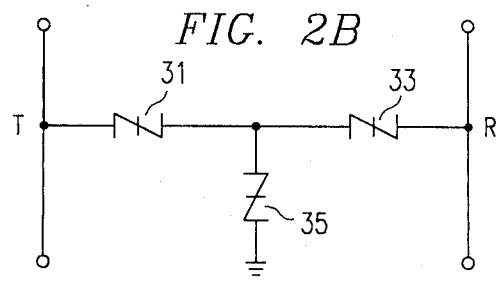
FIG. 2B
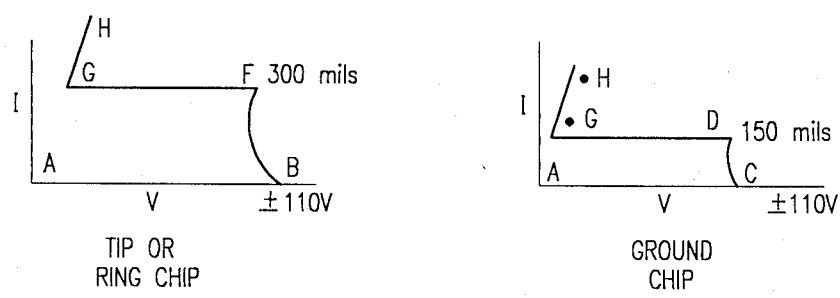
FIG. 3
FIG. 4

SOLID STATE OVERVOLTAGE PROTECTION CIRCUIT

TECHNICAL FIELD

This invention relates to electrical protection of electronic equipment, and more particularly to a solid state overvoltage protection circuit.

BACKGROUND OF THE INVENTION

Transmission lines may carry foreign electrical energy from, for example, transient voltage surges which can be generated by lightning strikes, industrial equipment, or the utilities themselves, as well as other equipment within a communications system. In order to safeguard electronic equipment, such as telecommunications equipment, computers, and instrumentation equipment, connected to such lines, traditional protective methods have included the use of gas discharge tubes, carbon blocks, fuses, heat coils, MOVs and other types of devices and wiring schemes. These methods do not provide a sufficient level of protection required for solid state circuits used in present day electronic equipment. These prior methods are slow to respond, allow significant voltage spikes above the clamping voltage before they begin to conduct, and respond with voltage overshoot.

Protection circuits have also been developed which include semiconductor elements, such as the protection circuit described and claimed in U.S. Pat. No. 4,408,248. However, such circuits have not proven satisfactory because they have required numerous components which are costly and which require excessive physical space. Other protection circuits have used a single solid state switch formed of N-type silicon material, such as RCA's Surjector, where once the breakover voltage is exceeded, there is a positive slope on the current-voltage diagram. Such a protection circuit dissipates additional energy until it turns on. The voltage overshoot is typically 5 to 15 volts or more, depending on the speed of the transient that the device is trying to protect.

A need has thus arisen for an overvoltage protection circuit that has a fast reaction time, offers tight voltage control, and provides for a lower power dissipation during switching. Additionally, a need has arisen for an overvoltage protection circuit that is economical, and which has reduced component requirements and reduced physical size, while maintaining high surge current capacities.

SUMMARY OF THE INVENTION

In accordance with the present invention, an overvoltage protection circuit for protecting electronic equipment is provided. The circuit includes a first bidirectional voltage sensitive switch having first and second terminals. The first terminal thereof is connected to a first line, e.g., the tip line. A second bidirectional voltage sensitive switch is provided and includes first and second terminals. The first terminal thereof is connected to the second terminal of the first voltage sensitive switch, and the second terminal thereof is connected to a second line, e.g., the ring line. A third bidirectional voltage sensitive switch having first and second terminals is further provided. The third voltage sensitive switch's first terminal is connected to the second terminal of the first voltage sensitive switch and to the first terminal of the second voltage sensitive switch. The second terminal of the third voltage sensitive switch is connected to ground potential. The switches are conductive when a respected voltage threshold is exceeded. The sum of the voltage thresholds of the first and third voltage sensitive switches is approximately equal to the sum of the voltage thresholds of the second and third voltage sensitive switches, such that the circuit is conductive when either of the thresholds of the first and third voltage sensitive switches or the second and third voltage sensitive switches is exceeded.

In accordance with one embodiment of the invention, the holding current of the third voltage sensitive switch (ground) is lower than that of either the first or second voltage sensitive switch. In this embodiment, the third switch turns on first, then both the first and second switches turn on in unison and hold the lines in balance during switching.

In accordance with another embodiment of the invention, at least one voltage sensitive switch in the tip and ground and ring and ground is made of P-type silicon material and has the characteristic of a negative slope with increasing current after exceeding the breakover voltage. As an example, only the voltage sensitive switch to ground, or both the voltage sensitive switch to tip and the voltage sensitive switch to ring, or all three voltage sensitive switches are made of P-type material. The combined switch of this protection circuit has the desirable characteristic of low switching power loss on continuous AC circuits and also safely conducting "sneak" currents to ground, even though they may be less than the holding current. "Sneak" current refers to the current at a high voltage that sneaks or passes by the protector before the device turns on.

BRIEF DESCRIPTION OF THE DRAWINGS

For a more complete understanding of the present invention and for further advantages thereof, reference is now made to the following Description taken in conjunction with the accompanying Drawings in which:

FIG. 1 is a block diagram of a protection circuit in accordance with the present invention connected between electronics equipment and a transmission line;

FIG. 2A is a block diagram of the protection circuit of the present invention;

FIG. 2B is a schematic diagram of one embodiment of the present invention;

FIG. 3 is a diagram of the current versus the voltage of a sidac used in the tip or ring line of one embodiment of the present invention;

FIG. 4 is a diagram of the current versus the voltage of a sidac used in the ground line of one embodiment of the present invention;

DETAILED DESCRIPTION

Figure 5:
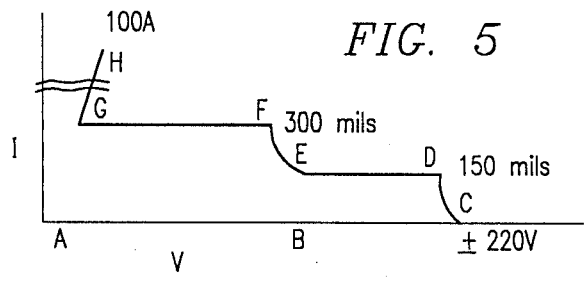
FIG. 5 is the combined current-voltage diagram for one embodiment of the present invention using three sidacs.

Referring to FIG. 1, electronic equipment 10 is connected via tip (T) line 12, 18 and ring (R) line 14, 20 to a protection circuit 16. Electronic equipment 10 may comprise, for example, telecommunications equipment such as central office, telephone, terminal or other station devices. Eelectronic equipment 10 may also comprise computers and instrumentation equipment, for example. Protection circuit 16 is connected to tip and ring lines 18 and 20 of a transmission line and may be in a single, three-lead package 17. Protection circuit 16 is also interconnected to ground potential 22. Electronic equipment 10 is thereby protected from foreign electrical energy due to a fault or transient voltage surge on tip and ring lines 18 and 20, respectively.

FIG. 2A illustrates the protection circuit 16 which includes three bidirectional voltage sensitive switches ($V_{ss}$) 30, 32, and 34. Voltage sensitive switch 30 is disposed in the tip line 12, 18, voltage sensitive switch 32 is disposed in the ring line 14, 20 and voltage sensitive switch 34 is disposed in the ground line 22. In application of the circuit 16 to a normal telephone line, the switch 34 requires at least the normal DC battery voltage, 52 volts, to initiate conduction. Protection circuit 16 creates a balanced protection system in that if either of the voltage sensitive switches 30 or 32 in the tip and ring lines, respectively, conducts to ground, there is an identical conduction of the other side of the tip or ring line to ground. Protection circuit 16 becomes conductive on both the tip and ring to ground line whenever the voltage on either the tip or ring to ground line is exceeded, provided the voltage on the tip or ring line not first grounded exceeds the remaining blocking voltage in the other of the tip or ring line. This balanced aspect of protection circuit 16 prevents a voltage differential between the tip and ring lines which can cause damage to electronic equipment 10. Foreign electrical energy on tip or ring lines is thereby dissipated rather than affecting electronics equipment 10. The balanced switching may take place on both tip and ring lines within 8 microseconds.

As shown in FIG. 2B, voltage sensitive switches 30, 32, and 34 may comprise three sidacs 31, 33, and 35, for example, the Model P2353A sidacs manufactured and sold by Teccor Electronics, Inc. of Irving, Tex. Additionally, voltage sensitive switches 30, 32, and 34 may comprise, for example triacs and a silicon controlled rectifier bridge with the voltage threshold of the triac controlled by a zener diode.

In one embodiment of he present invention, at least one of the voltage sensitive switches 30, 32, and 34 in the tip to ground and in the ring to ground circuit may be fabricated from a P-type semiconductor material having the characteristic of a negative slope with increasing current after exceeding breakover voltage. In this embodiment, lower switching currents are found that in designs now on the market, giving the device the ability to ground AC sneak currents without device degradation or adding more circuitry as shown in U.S. Pat. No. 4,408,248.

As one example, only the ground voltage sensitive switch 34 may be fabricated of P-type semiconductor material, such as silicon. In another example, both tip voltage sensitive switch 30 and ring voltage sensitive switch 32 may be made of P-type semiconductor material, or all three switches 30, 32, 34 may be made from such material. The combined breakover of two switches in a line to ground current exhibits a negative slope with increasing current after exceeding $V_{BO}$ (breakover voltage) due to selecting the proper P-type chip even if the companion voltage sensitive switch has a positive slope.

The combined threshold voltages of voltage sensitive switch 30 and voltage sensitive switch 34 and the combined threshold voltages of voltage sensitive switch 32 and voltage sensitive switch 34 are approximately equal and chosen for a predetermined specification. As an example, the switches 30, 32 and 34 may be three sidacs having a $V_{BO}$ of ±110 volts so there is ±220 volts $V_{BO}$ between tip and ground and ring and ground.

At least one voltage sensitive switch in both the tip to ground and ring to ground path has a holding current which is less than the other and chosen for a predetermined specification.

In one embodiment of the present invention, the holding current of voltage sensitive switch 34 is lower than the holding current of voltage sensitive switch 30 and voltage sensitive switch 32, such that voltage sensitive switch 34 conducts first so that both voltage sensitive switches 30 and 32 conduct in unison to hold the tip and ring lines in balance during switching. In such an embodiment, balanced switching may take place within 0.5 microseconds. The holding current of voltage sensitive switch 34 may comprise, for example, 20 mAmps. In a further modification of this embodiment, at least one of the switches 30, 32, 34 in a line to ground circuit is made of P-type semiconductor material, such as silicon, such that the combined breakover voltages of two switches in a line to ground circuit exhibit the characteristic of a negative slope with increasing current after $V_{BO}$ is exceeded, as described above.

Voltage sensitive switches 30, 32, and 34 may be housed in a single three lead plastic package such as, for example, a TO-92, TO-202, TO-220, TO-218, or TO-220A. The interconnection between voltage sensitive switches 30, 32, and 34 is internal to the package and the three leads comprise interconnections to the tip, ring and ground lines.

FIG. 3 illustrates the current-voltage diagram for the tip or ring chip of one embodiment, a three-element protection circuit 16 in which the voltage sensitive switches 30, 32 and 34 are sidac chips. Both the tip and ring sidac chips have a relatively high holding current $I_h$, e.g., 300 mils, block a voltage of ±100 volts and have the capability of passing a maximum surge of 100A. $10 \times 1000$ $\mu$s.

The three-element design provides three ±110 volt chips in the same package connected to offer a ±220 volt drop between tip to ground, ring to ground and tip to ring. The sidac chips are predetermined to insure that the chip in the ground leg turns on first when the applied voltage exceeds ±220 volts. When the ground chip turns on the potential to common for both tip and ring lines 12, 18 and 14, 20, respectively, drops to 100 volts. Since both tip and ring exceeds 100 volts, the sidac chips start to conduct together, dropping the voltage to zero volts and maintaining balance between the tip and ring circuits.

FIG. 4 illustrates the sidac chip for the voltage sensitive switch 34 in the ground leg of one embodiment of a three-element protection circuit 16 with sidacs for the voltage sensitive switches 30 and 32 as having the current-voltage diagram shown in FIG. 3 and described hereinabove. The sidac chip in the ground line needs to take two times the rated surge, two times 100A, as both tip and ring switches 30, 32 fire together. The $I_h$ for sidac chip in the switch 34 must be lower than the tip or ring sidac chip $I_h$, but high enough to meet certain predetermined applications, e.g., 150 mils $I_h$.

FIG. 5 illustrates the current-voltage diagram of both tip to ground and ring to ground of one embodiment of a three-element protection circuit 16 as illustrated in FIGS. 3 and 4 and described above. Referring to FIG.

5, A to B represents the switching voltage in both the tip and ring legs of the circuit, e.g., 110 volts. B to C is the switching voltage in the ground leg, e.g., 110 volts. A to C is the switching voltage of the combined three-element circuit, 220 volts, measuring ± tip to ground or ± ring to ground.

C to D is the switching current of the sidac chip 34 in the ground line, 150 mils, and illustrates the negative slope due to selecting the proper P-type chip as described above. D to E is the voltage drop in both tip and ring circuits when the ground chip, switch 34, turns on.

E to F is the switching current of each of the switches 30, 32 in the tip and ring legs, 300 mils, and again illustrate the negative slope due to selecting the proper P-type chip. F to G is the voltage drop when all the sidac chips turn on measured to ground in either line. G to H is the voltage increasing slightly as the sidac chips conduct the high current surges.

In operation of this embodiment, when an overvoltage spike appears to the circuit 16, the voltage-current path proceeds A, C, D, E, F, G, H and when the spike passes the current-voltage path proceeds H, G, F, E, D, C, A.

Figure 6A:
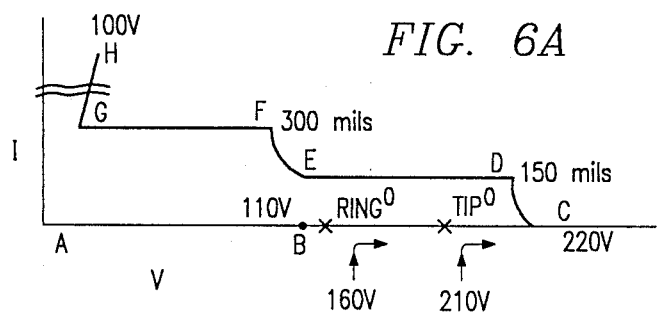
FIGS. 6A and 6B are current-voltage diagrams of the reaction of one embodiment of the invention to a small overvoltage.

FIG. 6A illustrates the current-voltage reaction of an embodiment of the three-element circuit 16 of FIGS. 3–5 to a small overvoltage of 230 volts. At 20 volts before peak voltage is reached, $tip^0$ is at 210 volts and $ring^0$ is at 160 volts. The ring has $-48$ to $-52$ volt DC on that line. No current flows at this point as the breakover voltage C of 220 volts has not been reached.

Figure 6B:
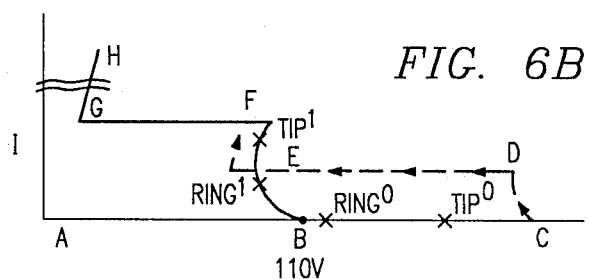

Referring to FIG. 6B, the voltage increases to 220 volts and the ground chip quickly follows the path C-D-E as it turns on. At this instant, $tip^1$ is moving from E to F depending on the available current. If enough current is available to drive $tip^1$ past F, the tip chip will turn on. At this instant, the ring line does not increase to 170 volts. Since the group chip shorted on, it is only being blocked by the chip in the ring line defined by A-B-F-G-H. Since the voltage is over the A-B voltage of 110 volts, the ring voltage drops to B and current increases up to B and then moves up to a point $ring^1$ between B-F and follows the B-F-G-H line depending on the available current.

Figure 7:
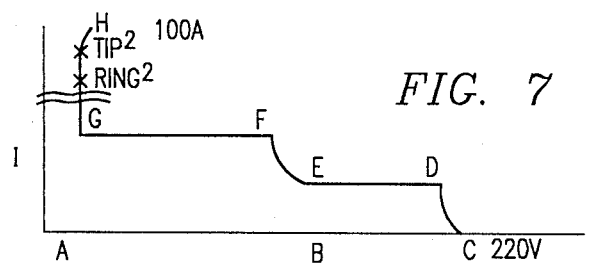
FIG. 7 is a current-voltage diagram of the reaction of one embodiment of the invention to a large current surge.

FIG. 7 illustrates the current-voltage diagram for the embodiment of the circuit 16 illustrated in FIGS. 3–5 and described above when a large current is present, e.g., 100 A. Both $tip^2$ and $ring^2$ will move on up the path E to F, switch F to G, then move G to H. When the current surge is over, both ring and tip voltages will recover down the path H-G-F-E-D-C, and both tip and ring lines are in the blocking mode with all three sidac chips recovered from the surge.

The present protection circuit creates a balanced protection system with minimal components, such that when either the tip or ring line conducts to ground, the other of the tip or ring line also conducts to ground. It also provides a degree of AC protection at low levels when fabricated with "P" type materials as described, while remaining economical to manufacture.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An overvoltage protection circuit for electronic equipment having tip and ring lines, comprising:

a first voltage sensitive switch having first and second terminals, a voltage threshold level and a holding current, said first terminal thereof connected to the tip line;

a second voltage sensitive switch having first and second terminals, a voltage threshold level and a holding current, said first terminal thereof connected to said second terminal of said first voltage sensitive switch and said second terminal thereof connected to the ring line;

a third voltage sensitive switch having first and second terminals, a voltage threshold level and a holding current, said first terminal thereof connected to said second terminal of said first voltage sensitive switch and connected to said first terminal of said second voltage sensitive switch, said second terminal thereof connected to ground potential the holding current of said third voltage sensitive switch being lower than the holding current of either of said first or second voltage sensitive switches; and said switches being conductive when a respective voltage threshold level is exceeded, the sum of the voltage threshold level is exceeded, the sum of the voltage theshold levels of said first voltage sensitive switch and said third voltage sensitive switch being approximately equal to the sum of the voltage threshold levels of said second voltage sensitive switch and said third voltage sensitive switch, such that the circuit is conductive when either threshold levels of said first and third voltage sensitive switches or said second and third voltage sensitive switches is exceeded.

2. The circuit of claim 1 wherein at least one of said voltage sensitive switches in the tip line to ground and ring line to ground circuit include P-type semiconductor material.

3. The circuit of claim 1 wherein said voltage sensitive switches are disposed within a single housing having three terminals comprising the first terminal of said first voltage sensitive switch, said second terminal of said second voltage sensitive switch and said second terminal of said third voltage sensitive switch.

4. The circuit of claim 1 wherein said third voltage sensitive switch requires at least the normal DC battery voltage on the ring line to conduct.

5. The circuit of claim 1 where each of said voltage sensitive switches is a single semiconductor device.

6. The circuit of claim 1, wherein each of said voltage sensitive switches is a sidac.

7. A solid state transient voltage protection circuit for electronic equipment, comprising:

three solid state bidirectional voltage sensitive switches, said switches being conductive when a voltage threshold is exceeded, said switches being interconnected with a first switch in one line, a second switch in a second line, and the third switch connected between a ground potential and a common node between said first and second switches, the combined switching voltages of said first and third switches being substantially equal to the combined switching voltages of said second and third switches, such that the circuit conducts on both the first line to ground and second line to ground when the voltage on the first line or second line to ground exceeds the threshold levels and the voltage on the other line to ground exceeds the remaining blocking voltage in the other line, and the holding current of said third switch is predetermined to be lower than the holding current of said first and second switches, whereby a balanced voltage protection circuit is provided.

8. The solid state transient voltage protection circuit for electronic equipment of claim 7, wherein said first, second and third bidirectional voltage sensitive switches are housed in a single, three-lead package.

9. A three-element solid state overvoltage protection circuit to provide transient surge protection for electronics equipment connected to transmission lines, comprising:

a first sidac having a first terminal connected to a first terminal of a second sidac, the second terminals of said first and second sidacs being available for connection to the transmission lines to the electronic equipment to be protected; and a third sidac having a first terminal connected to the terminals interconnecting said first and second sidacs and a second terminal connected to ground, said sidacs having predetermined breakover voltage and holding current ratings, the sum of the breakover voltage of said first and third sidacs is approximately equal to the sum of the breakover voltage of said second and third sidacs, and the holding current of said third sidac is lower than the holding currents of said first and second sidacs, whereby said sidacs conduct transient voltages exceeding a predetermined level to ground to protect the electronic equipment.

10. The overvoltage protection circuit of claim 9 wherein said third sidac is made of P-type silicon material and has the characteristic for the circuit of the first and third sidacs or the circuit of the second and third sidac of a negative slope in a current-voltage diagram as current increases past the breakover voltage.

11. The overvoltage protection circuit of claim 9 wherein at least two of the three sidacs are made of P-type silicon material and have the characteristic for the circuit of the first and third sidacs or the circuit of the second and third sidacs of a negative slope in a current-voltage diagram as current increases past the breakover voltage.

12. A three-element solid state overvoltage protection circuit to provide transient surge protection for electronic equipment connected to transmission lines, comprising:

first and second sidacs, said first sidac having a first terminal connected to a first terminal of said second sidac, the second terminal of said first and second sidac being available for connection to the transmission lines to the electronic equipment to be protected; and a third sidac having a first terminal connected to the terminals interconnecting said first and second sidacs and a second terminal connected to ground, said first, second and third sidacs having predetermined breakover voltages and holding current ratings, the sum of the breakover voltage of said first and third sidacs being approximately equal to the sum of the breakover voltage of said second and third sidacs, the holding current of said third sidac being lower than the holding currents of either of said first or second sidacs, at least one of said first, second or third sidacs in the transmission lines to ground including P-type semiconductor material and having a characteristic of a negative slope with increasing current after exceeding the breakover voltage, whereby the protection circuit conducts to ground when either the threshold level of said first and third sidacs or said second and third sidacs are exceeded and the third sidac turns on first and then both the first and second sidacs turn on in unison and hold the transmission lines in balance during switching, and there is less overvoltage during turn on of the overvoltage protection circuit.

13. The overvoltage protection circuit of claim 12, wherein each of said sidacs is made of p-type silicon material and has a negative slope with increase in current after exceeding the breakover voltage, whereby there is less overvoltage during turn on of the overvoltage protection circuit.

* * * * *